March 6, 1934.   D. IRWIN   1,950,247
BUBBLE TOWER TRAY
Filed May 13, 1933
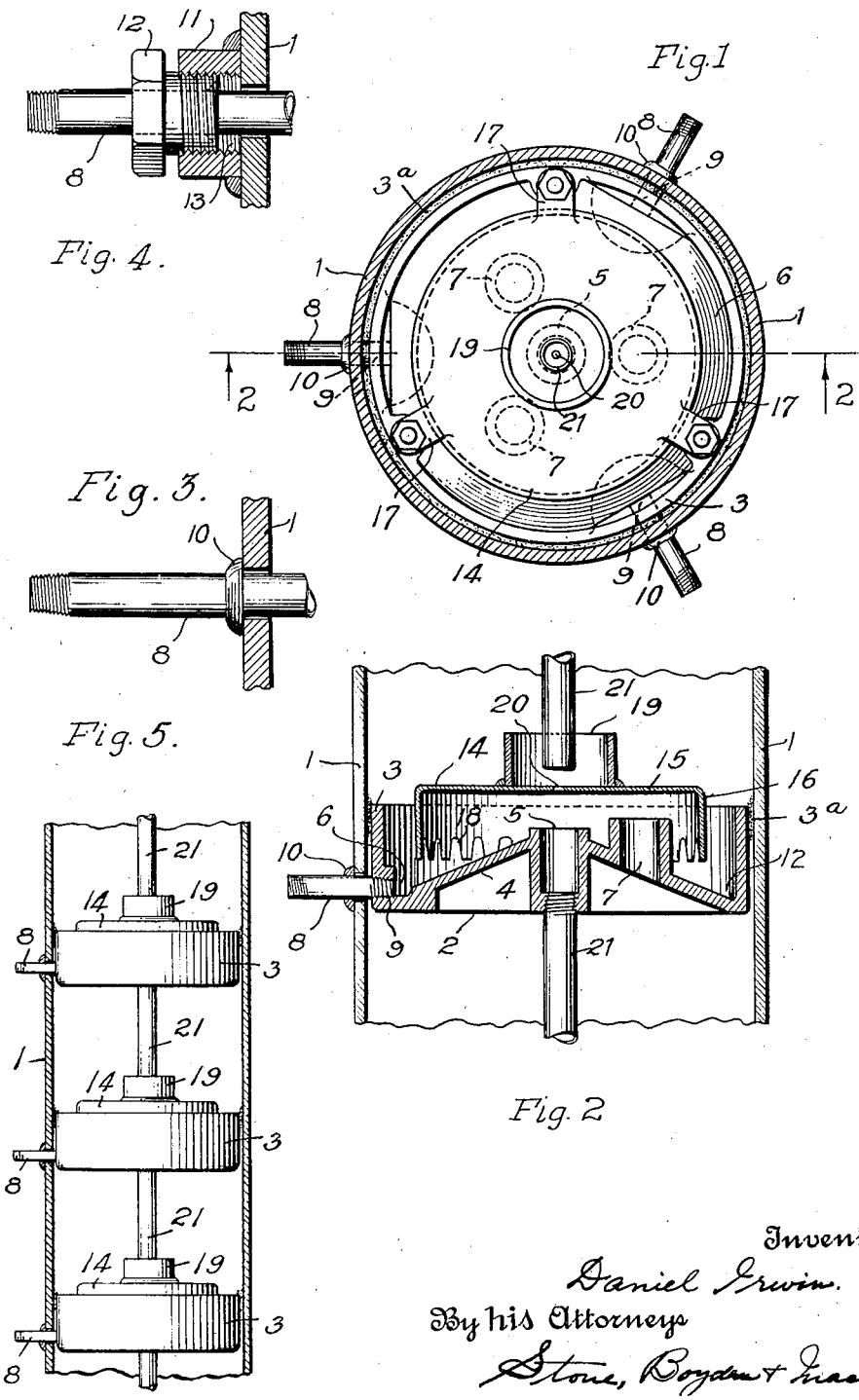
Inventor
Daniel Irwin.
By his Attorneys
Stone, Boyden & Mack.

Patented Mar. 6, 1934

1,950,247

UNITED STATES PATENT OFFICE 1,950,247

BUBBLE TOWER TRAY

Daniel Irwin, New York, N. Y.

Application May 13, 1933, Serial No. 670,988

4 Claims. (Cl. 261—114)

This invention relates to improved apparatus for the mixing of gases or vapors with liquids. The improvement is directed to means for effecting improved absorption of the type which takes place in the trays of a bubble tower in which there is movement of gases or vapor through or in contact with liquid.

One of the features of the invention is the provision of simple means for effecting the introduction of liquids to or withdrawal from any selected tray in a bubble tower without disturbing the shell of the tower. By this control feature, a flow may be altered after the apparatus has been constructed even though the original specification of the product desired may be in error or a change may be desired from those originally selected.

A primary object of the present invention is to provide in a bubble tower a simple and inexpensive form of bubble tray which may be easily and quickly mounted.

Another object is to provide a novel supporting arrangement for the trays whereby control instruments such as thermometers may be easily and quickly inserted or removed from the liquid on the tray from the exterior of the tower.

A further object is to provide a bubble tray having a shape such that the liquid on the tray shall be concentrated under the edge of the bubble cap but shall be in relatively small quantity and having a maximum area or surface exposed to direct contact with the vapor or gas.

A still further object is to provide a bubble tray of the aforesaid character which shall bring the liquid and vapor or gas at the point of mixing under the edge of the bubble cap close to equilibrium of temperature by preheating the descending liquid from the tray above, and pre-cooling the ascending vapor or gas from the tray below, by contacting with the top of the bubble cap, thereby reducing the number of trays in a bubble tower to a minimum.

With the foregoing and other objects in view, the invention may be stated to consist in the various novel features of construction and arrangement or combination, all of which will be fully described hereinafter and pointed out in the appended claims.

In the drawing accompanying and forming part of this application:

Fig. 1 is a transverse sectional view through a bubble tower equipped with my improved bubble trays and showing one of the same in top plan view;

Fig. 2 is a vertical sectional view taken on the line 2—2 of Fig. 1;

Fig. 3 is a detail view partly in section and partly in elevation of one of the tray supports;

Fig. 4 is a similar view of a modified form of tray support; and

Fig. 5 is a diagrammatic representation of a vertical section through a tower of the present invention illustrating a plurality of bubble trays each having a supporting pipe extending laterally therefrom.

Describing the various parts by reference characters, 1 denotes the shell of a bubble tower and in which are assembled a plurality of bubble trays 2. Each bubble tray is substantially cup shaped in form and is provided with a side wall 3 and a conical bottom 4 that merges into a well 5 at the center thereof. The side wall 3 and conical bottom 4 define a trough 6 toward which liquid in the tray drains as will be more fully explained hereinafter. One or more hollow bosses 7 are formed in the conical bottom wall 4 and provide chimneys or vents for the upward passage of vapors or gases.

Each tray is supported in the tower by a plurality of pipes 8 which extend through shell 1 and are threaded or otherwise fastened to the tray as indicated at 9, such threaded connection extending through the side wall of the tray and communicating with trough 6. The pipes may be welded to the shell 1 as indicated at 10 or a detachable connection may be provided as shown in Fig. 4 wherein an internally threaded boss 11 is welded to the shell 1 and a gland nut 12 is threaded therein to provide a packing gland 13 about the pipe 8.

Normally a cap closes the outer end of each pipe support but if desired, one or more of the caps may be removed and suitable instruments, such as thermometers may be inserted through the pipes and into the trays. Similarly, liquid may be introduced into the trays or withdrawn therefrom through the pipes 8. If it is not desired to have access to the trays in this manner, it is obvious that solid rods could be substituted for the pipe supports 8.

A bubble cap 14 in the form of an inverted cup shaped member having a top wall 15 and a depending side wall 16 is positioned over each tray. The cap 14 is supported by the tray in spaced relation thereto, and one satisfactory construction includes ears 17 on the cap which are bolted or otherwise secured to the tray as shown in Fig. 1. The lower edge of side wall 16 is serrated as indicated at 18 and in spaced relation with respect to the tray, as shown in Fig. 2.

The top wall 15 of each cap is fitted with an upstanding collar 19 and the wall 15 within said collar is perforated, as indicated at 20. This collar serves to receive a pipe 21 which is threaded into the well 5 of the tray thereabove.

The space between the tower wall 1 and side walls 3 of the trays is rendered substantially gas tight by suitable packing indicated at 3ª and forming no part of the present invention, since extremely accurate fitting of tower and tray may render such packing of correspondingly less importance.

In operation, liquid admitted to the top of the bubble tower flows into collar 19 of a bubble cap and fills the same to overflowing, from whence the liquid flows down over the surface of the bubble cap into the bubble tray. Optionally, liquid or gas, or both, may be admitted through the pipe 8 into any tray. The bubble tray is filled to the level of well 5 thereby submerging the serrated edge 18 of the bubble cap. The overflow of liquid from each tray passes down well 5 and pipe 21 onto the next lower bubble cap. Meanwhile vapor or gas is injected into the lower portion of the tower and rises through chimneys or vents 7 of a tray and collects under the bubble cap from whence it passes through the descending liquid and escapes through the notches of the serrated edge 18 and passes up through the chimneys or vents of the next higher tray.

When it is desired to drain the tower, the liquid in collars 19 will drain through apertures 20 and the individual trays may be drained through pipe supports 8.

From the foregoing description, it will be noted that use of a bubble tray with a conical bottom wall serves to concentrate the greater part of the liquid at the line of contact with the vapor or gas bubbling through the liquid, and also exposes a maximum wet surface per volume of liquid on the tray for purposes of heat transfer between vapor and liquid.

It will also be noted that the arrangement of the bubble cap with respect to a tray above is such that liquid from a tray above is contacted through the cap with vapor from a tray below, giving a greater temperature differential for heat transfer than is obtained by contacting liquid from the same tray with vapor from the tray below as in the conventional bubble tower now in common use.

It will also be obvious that the arrangement of bubble cap with respect to its tray is such that the wetted surface of liquid on the tray in contact with the vapor above the bubble cap is reduced to a minimum. In addition, liquid flowing over surface 15 and down surface 16 tends to break up foam particles with which it comes in contact thereby further reducing the possible head of foam above the tray, thus permitting a closer spacing of the trays in the tower, as such vertical spacing is determined by the hazard of the rising vapor and foam entraining liquid particles and contaminating the quality of the liquid on the tray above.

In the foregoing, it will be clear that the apparatus of this present invention is capable of functioning for absorption as well as for fractionation, and may be useful in such different plants as those providing for gasoline absorption and ammonia absorption. Also, there is provision for heat exchange since the mixing of gases or vapors with liquids for absorption of the gases or vapors in the liquids does often include a required heat exchange in the course of which a portion of the vapors or gases may be actually condensed. Also, this present apparatus may function for a fractional distillation in which, under conditions of direct heat exchange, there may be absorption.

What I claim is:

1. A bubble tower having a plurality of bubble trays arranged therein in spaced relation, and hollow supports projecting through the wall of said tower and through the walls of said bubble trays and providing ported communication for said trays.

2. A bubble tower having a plurality of bubble trays arranged therein in spaced relation, each of said trays having an inclined bottom defining a trough, and hollow supports projecting through the wall of said tower and communicating with said troughs.

3. A bubble tower having a plurality of bubble trays arranged therein in spaced relation, each of said trays having an inclined bottom defining a peripheral trough and an elevated central portion, said central portion having a liquid well formed therein, a chimney formed in said inclined bottom and extending above said central well, and a bubble cap associated with each tray, said bubble cap being spaced above said chimneys and having an edge portion projecting into said trough below the normal liquid level therein.

4. A bubble tower having a plurality of bubble trays arranged therein in spaced relation, each of said trays having an inclined bottom defining a peripheral trough and an elevated central portion, said central portion having a liquid well formed therein, a chimney formed in said inclined bottom and extending above said central well, a bubble cap supported by each tray above said chimneys and having a depending edge portion enclosing said chimneys and projecting into said trough below the normal liquid level therein, a collar formed on the surface of each bubble cap, and a conduit connecting the central well of each tray and projecting into the collar of an adjacent bubble cap.

DANIEL IRWIN.